(No Model.)

G. W. HOWELL.
VEHICLE WHEEL.

No. 316,365. Patented Apr. 21, 1885.

Attest
Joseph H. Sims
M. E. Millikan

Inventor
George W. Howell
by Wood & Boyd
his Attorneys &c

United States Patent Office.

GEORGE W. HOWELL, OF COVINGTON, KENTUCKY.

VEHICLE-WHEEL.

SPECIFICATION forming part of Letters Patent No. 316,365, dated April 21, 1885.

Application filed August 26, 1884. (No model.)

*To all whom it may concern:*

Be it known that I, GEORGE W. HOWELL, a resident of Covington, in the county of Kenton and State of Kentucky, have invented certain new and useful Improvements in Wheels, of which the following is a specification.

My invention relates to an improvement in wheels.

The object of my invention is to provide ready means for making a metal wheel and straining the spokes by moving the collars laterally on the axle, so as to make a cheap, durable wheel, all of which will be fully set forth in the description of the accompanying drawings, making a part of this specification, in which—

Figure 1:
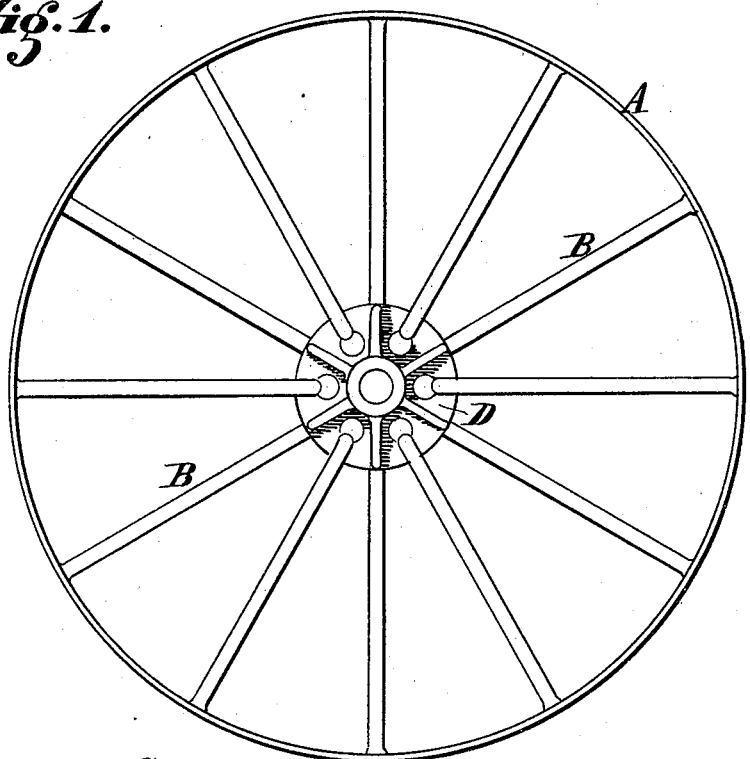
Figure 2:
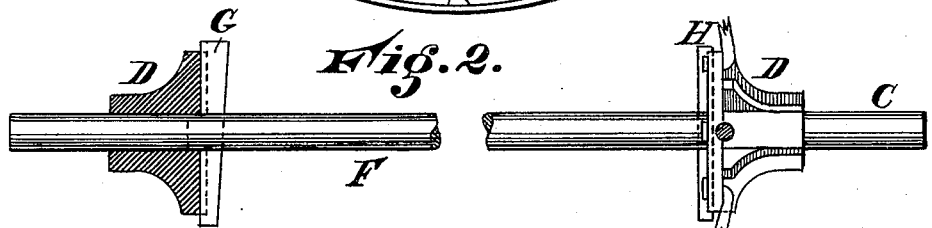
Figure 3:
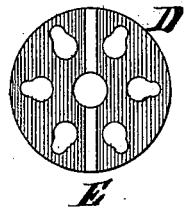
Figure 4:
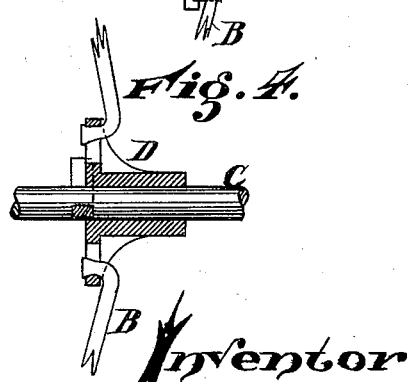

Figure 1 is a side elevation of my improved wheel. Fig. 2 is an enlarged sectional elevation of the hub and straining devices. Fig. 3 is an inside elevation of one of the hubs. Fig. 4 is a detail sectional view.

A represents the rim of the wheel; B, the spokes; C, the axle; D, collars.

The preferred form of connecting the spokes to the collars D is by means of slots in the collars D and bent heads upon the spokes, as shown in Figs. 3 and 4, which are fully described in Letters Patent No. 293,251, granted me February 12, 1884; but I do not wish to limit myself to this manner of connecting the spokes to the collars or hubs, as other means may be employed and still accomplish the object of my present invention.

E represents a slot or groove formed in the inner face of the collars D.

G represents a pin or key which passes through a hole pierced in the axle F and rests in the groove E, to hold collar D in place.

H represents a round or untapered pin, which rests in a similar groove or recess.

One feature of my invention consists in providing one or more taper pins G, as the use of the taper key G allows the wheel to be tightened, if the spokes should become loose, by driving one or more keys farther; but I do not wish to limit myself to this feature alone, as the untapered pins H will serve a very good purpose.

The advantages of this form of constructing the wheel are as follows: The hubs and shaft require no fitting, and the wheel can be readily put together or taken apart. It may be tightened as it becomes worn, making at once a cheap, strong, and durable wheel.

Having described my invention, what I claim is—

The combination of the axle F, having the transverse perforation, the collars D, secured to the spokes and each having its inner face constructed with the transverse groove E, and the keys G, passing through the axle and resting in the grooves in the inner faces of the collars to conceal and guard the keys, substantially as described.

In testimony whereof I have hereunto set my hand.

G. W. HOWELL.

Witnesses:
JOSEPH W. SIMS,
M. E. MILLIKAN.